March 10, 1959 A. G. SANGSTER 2,876,650
APPARATUS FOR AUTOMATICALLY RELATIVELY POSITIONING
WORKHOLDERS, TOOLS AND THE LIKE
Filed Jan. 13, 1955 9 Sheets-Sheet 1

INVENTOR
ARLON G. SANGSTER

ATTORNEY

INVENTOR
ARLON G. SANGSTER
ATTORNEY

March 10, 1959 A. G. SANGSTER 2,876,650
APPARATUS FOR AUTOMATICALLY RELATIVELY POSITIONING
WORKHOLDERS, TOOLS AND THE LIKE
Filed Jan. 13, 1955 9 Sheets-Sheet 3

INVENTOR
ARLON G. SANGSTER
by Charles R. Fay
ATTORNEY

INVENTOR
ARLON G. SANGSTER

ATTORNEY

INVENTOR
ARLON G. SANGSTER

ATTORNEY

March 10, 1959 A. G. SANGSTER 2,876,650
APPARATUS FOR AUTOMATICALLY RELATIVELY POSITIONING
WORKHOLDERS, TOOLS AND THE LIKE
Filed Jan. 13, 1955 9 Sheets-Sheet 7

INVENTOR
ARLON G. SANGSTER

ATTORNEY

FIG. 29

March 10, 1959  A. G. SANGSTER  2,876,650
APPARATUS FOR AUTOMATICALLY RELATIVELY POSITIONING
WORKHOLDERS, TOOLS AND THE LIKE
Filed Jan. 13, 1955  9 Sheets-Sheet 9

INVENTOR
ARLON G. SANGSTER
ATTORNEY

United States Patent Office 2,876,650
Patented Mar. 10, 1959

2,876,650

APPARATUS FOR AUTOMATICALLY RELATIVELY POSITIONING WORKHOLDERS, TOOLS AND THE LIKE

Arlon G. Sangster, Leominster, Mass., assignor, by mesne assignments, to Sundstrand Machine Tool Co., Rockford, Ill., a corporation of Illinois Application January 13, 1955, Serial No. 481,569

45 Claims. (Cl. 74—365)

This invention relates to new and improved automatic control means for relatively and correctly positioning or re-positioning a workpiece relative to a tool which is to work upon the same, and the invention has been illustrated as applied to work-tables which are movable with relation to a machine tool cutter or the like, the mechanism relating to the power-actuated movement of such tables in order to attain predetermined locations of work for the cutter.

Further objects of the invention include the provision of a pair of slides, one of which is superposed on the other and actually holds the workpiece, said members being movable at angles to each other for universal positioning of a workpiece in a single plane with relation to a machine cutter to work on the workpiece, said mechanism including extremely accurate means for correctly positioning the slides, said means being controlled by an operator who merely has to push selective push-buttons or feed a control tape to a selector device, in order to carry out the full cycle of operation of the machine.

Still further objects of the invention include the provision of an automatic work-positioning device as above described including a control device having a series of control members of graduated degree of operation and consequent degree of control of the work-table, so that the work-table is adjusted automatically, as for instance first by inches, then tenths, then hundredths, and finally thousandths of an inch, said control means being operated from a central or remote control point by the push-button or tape, and said control device comprising in general electrically-operated means for energizing a selected part only of a series of armatures or contact points for each one of the individually actuated control members, so as to provide a basis for selection of points for positioning of the work-tables; and the provision of the device above described wherein the several parts of the armatures or contacts which are energized or de-energized control the operation of a servo-motor used to travel the tables in the direction called for by the actual location of the energized or de-energized armatures or contacts and including a series of gearing for operating at relatively high speed and progressively at lower speeds during the inch, tenths, hundredths, etc. control portions of the cycle of operation.

Other objects of the invention include the provision of a novel device employing a perforated tape and means to position or travel the tape with respect to a reading device including means for registration with the apertures in the tape, for energizing the afore-mentioned armatures or contacts according to the perforations in the tape; and including means for repeating the complete cycle on different workpieces, and also including mechanism for changing the position of the work-tables and therefore the workpiece as many times as called for with reference to working upon a single piece; and the provision of an alternative control comprising a push-button board for directly controlling the energization and de-energization of the armatures or contacts under control of the operator without the use of a tape.

A still further object of the invention resides in the provision of means for eliminating back-lash, this means being automatic and accomplishing the results stated by the tables uni-directionally only to a desired location, at the end of the travel of the table, regardless of which side of the desired point the table should happen to be just prior to the start of travel of the table to the new location, and thereby ensuring that the same mechanical elements, e. g., a screw and nut, always contact at the same sides or faces to provide against any looseness of parts.

Other objects of the invention include constructions and combinations which will appear more fully hereinafter.

Reference is to be had to the accompanying drawings, in which.

This invention has been illustrated as applied to a radial drill or boring machine, but it is to be understood that the invention is applicable to other machine tools and to any machine or application where it may be desirable or convenient. Furthermore, the invention has been shown as applied to the control for a work-table which is moved relative to a fixed but adjustable point, such as the tool of the machine, and includes another work-table movable at right angles thereto for co-planar universal movement of a point to be located in a horizontal plane with reference to a vertically arranged tool. However, it is to be understood that the inventive concept is not so limited as to the planes of the tool and tables which may be located as desired; and that the tables may be moved angularly as well as rectilinearly; and the control mechanism may be applied to a tool or tools to be moved relative to a fixed piece of work. Also, other changes which will be clear to those skilled in the art come within the scope of the invention.

Figure 1:
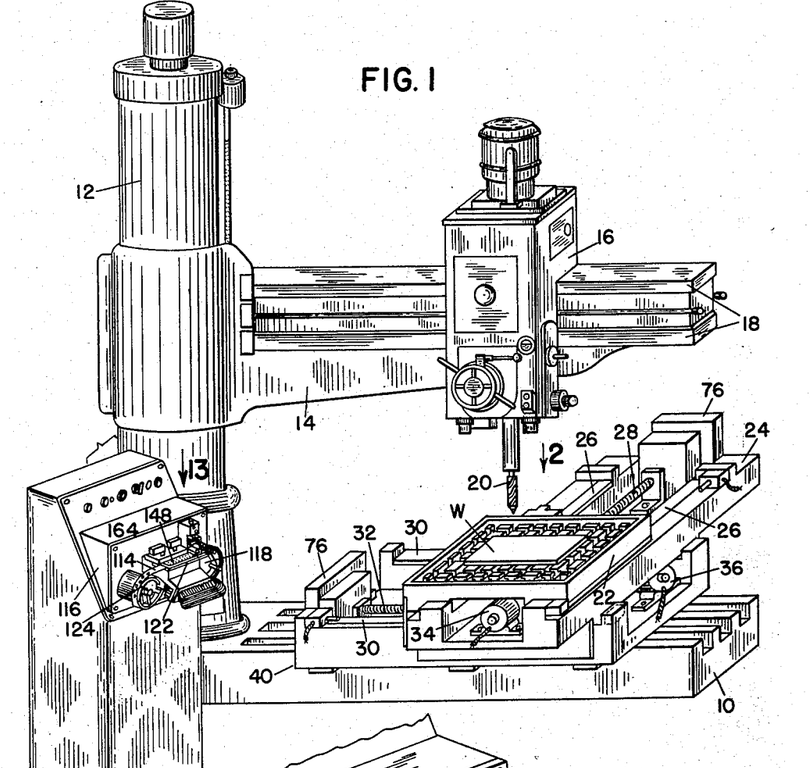
Fig. 1 is a perspective view illustrating an embodiment of the invention as applied to a radial drill or boring machine.
Figure 2:
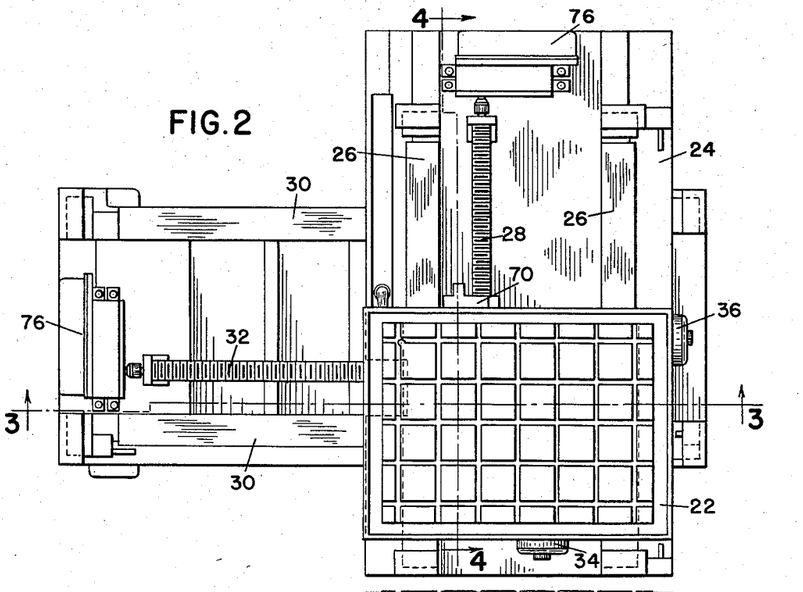
Fig. 2 is a plan view, looking in the direction of arrow 2 in Fig. 1 and showing the work-tables only.

Referring now to Fig. 1 as illustrative of the invention, there is here shown a machine base 10 upon which is mounted a standard 12 having a radial arm 14 thereon. On the arm 14, there is provided a housing or the like 16 for rectilinear motion along the radial ways 18, the latter being bodily movable angularly on the standard 12. As is well known in the art, these parts are provided with means for holding the same in adjusted position, so that the tool which is so indicated at 20 may essentially become fixed relative to the work, which is located on and adjustably movable along a base 10 by means of a pair of work-tables, each having independent movements in horizontal planes but at right angles to each other, these tables being indicated at 22 and 24.

The control mechanism which forms the basis for the present machine is directed to automatically positioning these tables according to a predetermined plan, and it is apparent from inspection of Fig. 1 that the table 22 moves along ways 26 on table 24, as for instance under influence of a threaded shaft 28; and that the table 24 is movable at right angles thereto on ways 30 by a similar threaded shaft 32. These shafts are driven respectively as for instance by motors 34 and 36, and the shafts 28 and 32 are extremely accurately controlled in order to rotate sufficiently to position the respective tables in the correct desired position relative to tool 20 for the operation of the tool on the work W at a predetermined desired location with extreme accuracy. The work-table 22 is provided with more or less conventional slots for clamping the work W thereto, and ordinary means will be provided for a zero position or basis such as coordinate lines, etc. for the point of departure with reference to the control motors of the work-tables.

In general, the operation of the machine is such that the operator merely inserts a previously perforated tape according to a predetermined plan into a tape reader or locater which automatically finds the perforations and sets up automatically the control device, whereby the tables will be moved to the exact location required merely upon the pushing of a start button by the operator. Also, the tape is provided with means for feeding the same, so that different operations may be made on the same workpiece without any attention whatsover on the part of the operator with the exception of the above-named initial positioning of the tape on the reader and pushing a button to start the tape feeding.

Alternatively, however, instead of using a tape, other pre-selected means may be used such as for instance a keyboard upon which the ordinates and abscissa increments are provided by means of buttons which the operator may push according to pre-arranged plans which may be given to the operator by a production clerk, etc. In other words, the operator need not be bothered in any degree whatsoever with setting up the machine, with blueprints, or with any operations whatsoever except to proceed with the tape or the buttons according to the predetermined plan.

Figure 5:
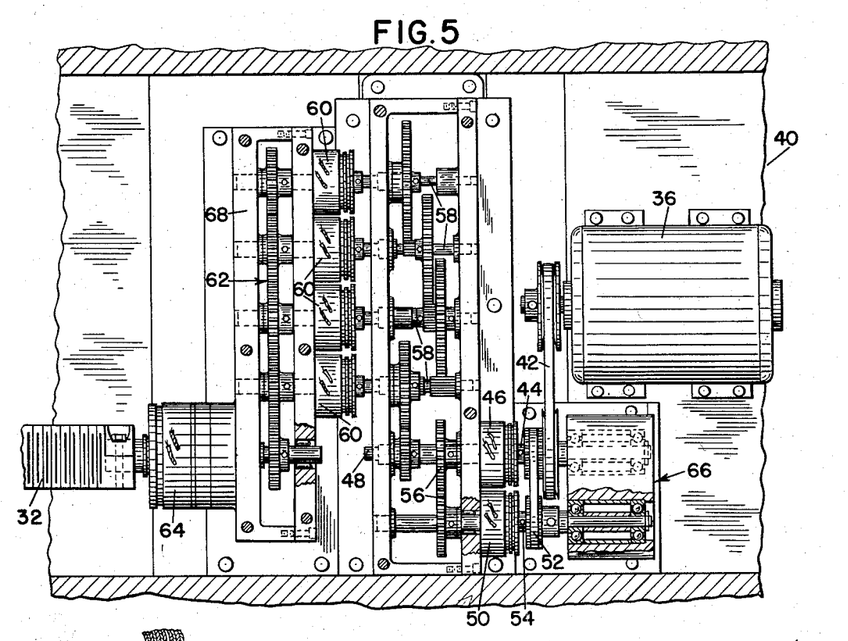
Fig. 5 is an enlarged section on line 5—5 of Fig. 3.
Figures 6, 7:
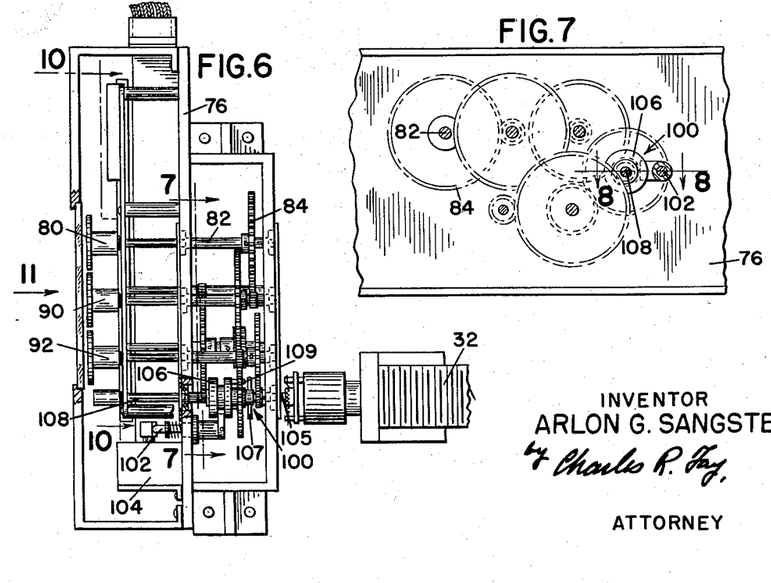
Fig. 6 is an enlarged section on line 6—6 of Fig. 3.
Fig. 7 is a view in elevation with parts in section and looking along the line 7—7 of Fig. 6.

Fig. 5 illustrates one of the motors and its drive connections to its respective threaded shaft, and for this purpose, the mechanism for moving table 24 is shown. The mechanism for moving the table 22 is exactly the same, but the supporting arrangement of the motor 36 and shaft 32, etc. resides in a frame-work or the like generally indicated at 40, and this frame-work may be adjusted along the base 10 if desired.

In any event, the motor 36 drives by any desired means such as pulley-and-belt 42, a shaft 44 driving a magnetic clutch 46, in turn driving a shaft 48. If the clutch 46 is dis-engaged and a like clutch 50 is engaged, the shaft 44 will drive through the driving connection 52 and a reverse shaft 54, and this of course will cause the gears at 56 to operate in a reverse direction.

The shaft 48 drives a series of jack shafts through the gearing shown in detail in Fig. 5. These jack shafts are stepped down according to a pre-arranged plan which may be in multiples of ten, but each of the jack shafts which are indicated at 58 is separately utilized by means of the separate electric clutches 60. Therefore, having selectively energized a particular clutch 60 and a particular clutch 46 or 50, the shaft 32 will be seen to be rotated at different speeds and in either direction selectively by means of the gearing generally indicated at 62 for as long a period of time as called for by the means energizing and de-energizing the respective clutches.

It is intended, for instance, that one of the clutches 60 will be utilized as a first stage to rotate the shaft rapidly as for instance to travel the engaged work-table a matter of inches; this clutch will then cut out and the next clutch cut in to travel the table at a slower rate to find the correct tenth of an inch; the next clutch 60 will correctly locate the table at the predetermined one-hundreth of an inch mark, and the last clutch will do the same operation at a thousandth of an inch. The operation of the clutches is determined by a control mechanism to be described, and this control mechanism is directly controlled from the tape or the keyboard above briefly referred to. The reference numeral 64 indicates an electric brake which may be also controlled in order to help in stopping the shaft.

Figure 3:
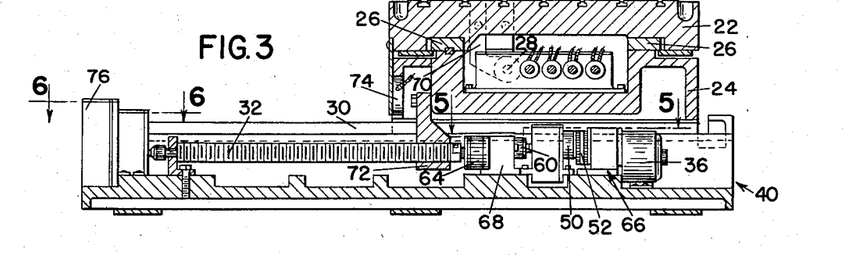
Fig. 3 is a vertical section on line 3—3 of Fig. 2.
Figure 4:
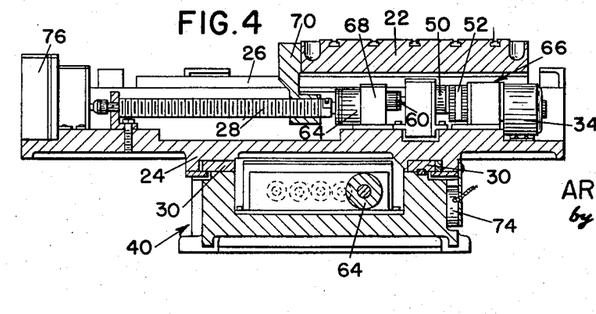
Fig. 4 is a vertical section on line 4—4 of Fig. 2.

Referring now to Figs. 3 and 4, it will be seen that the parts so far described are the same for both work-tables. The bearing box for the shafts 44 and 54 is indicated generally at 66 for each motor, the reversing clutches which can be seen in these figures are both indicated at 50, the gear boxes for gears 62 are indicated at 68, and the electric clutches at 60, and in any event each of the shafts 28 and 32 will be connected to its respective table by some means such as a nut 70, 72 and the clutches so far described are each shown with electrical connections for operation electrically by the control means to be described.

Supposing that the gearing 58 should be geared down at a ratio of ten-to-one and the gearing 62 is on a one-to-one basis, by the selective energizing of various of the clutches 46, 50 and 60, the speed of the screw shaft 32 can be controlled as to a relationship as follows:

| motor speed, 2 | motor speed, 20 | motor speed, 200 | motor speed, 2,000 |
|---|---|---|---|

The tables may be provided with flat electric brakes which may be referred to as "table brakes" and one of these is indicated as at 74, the brake 64 being for the shaft 32. Upon energization, the flat table brakes will prevent any tendency to move on the part of the tables and energization of brake 64 will hold the shaft 32 fixed. There will also of course be adequate provision for machine guards, etc. but these have not been shown, as they are well known to those skilled in the art.

Figure 11:
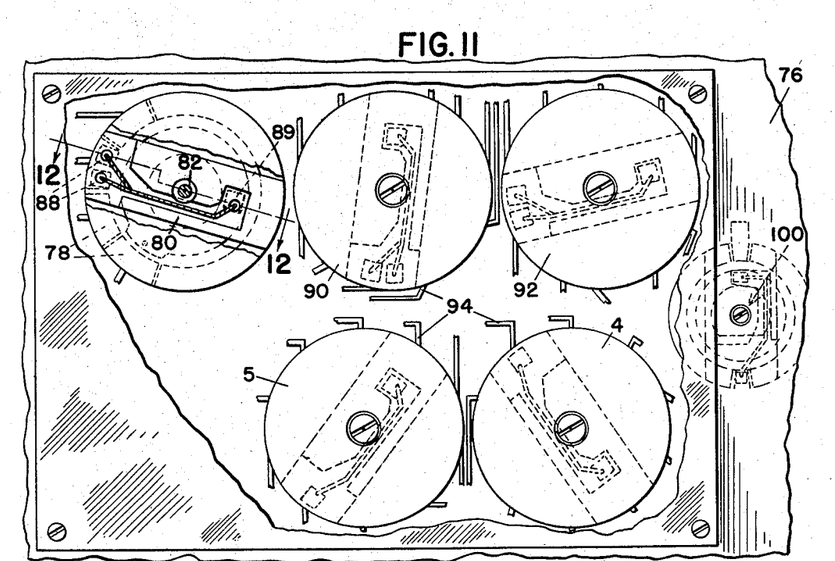
Fig. 11 is a similar view, looking in the direction of arrow 11 in Fig. 6, certain of the parts being broken away.

The control device referred to above is shown principally in Figs. 6 to 12 inclusive and this comprises a control box 76 at the opposite end of each of the respective threaded shafts or lead screws 28, 32. This box contains five sets of control members each having a plurality of spaced commutator bars or contacts. The control members as illustrated are rotary and are geared together and are driven by the respective screw-shaft or lead screws 28, 32 as the case may be. The sets of commutator bars or contacts may be fixed, and in cooperation therewith each is provided with a brush arm member, it being these arms that are actuated by the shaft 32 in Fig. 6. The various sets of commutator bars are indicated in Fig. 11, and these are indicated as first stage, second stage, third stage, fourth stage and fifth stage, and they are geared in a ten-to-one ratio so as to provide a decade registering device. If the screw 32, for instance, is provided with five threads per inch, the ratio of rotation of the brush arms is as follows:

1 turn of lead screw equals:

| | Turn |
|---|---|
| Stage I | 1/500 |
| Stage II | 1/50 |
| Stage III | 1/5 |
| Stage IV | 2 |
| Stage V | 20 |

There are ten contact or commutator bars in each stage, and the unit bars can be given the following values in inches of table movement:

| Stage | Each bar is equal to— |
|---|---|
| I | 10 inches. |
| II | 1 inch. |
| III | 1/10 inch. |
| IV | 1/100 inch. |
| V | 1/1000 inch. |

The commutator bars or contacts are arranged circularly, but need not be, as they could be rectilinear for sliding brushes. In any event, the first stage is indicated as having a series of commutator bars as indicated at 78 and the brush member therefor is indicated at 80. This brush is rotated as by a shaft 82, shaft 82 being in turn geared as at 84 to the succeeding stages (see Fig. 6).

Figure 12:
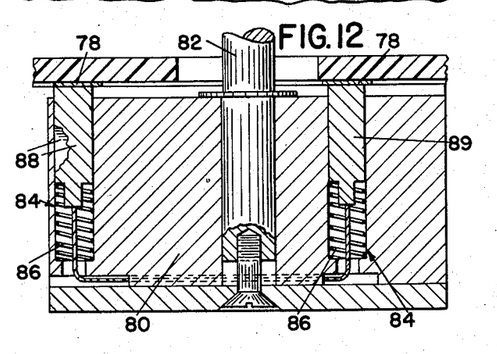
Fig. 12 is an enlarged section on line 12—12 of Fig. 11.
Figures 13, 14, 18:
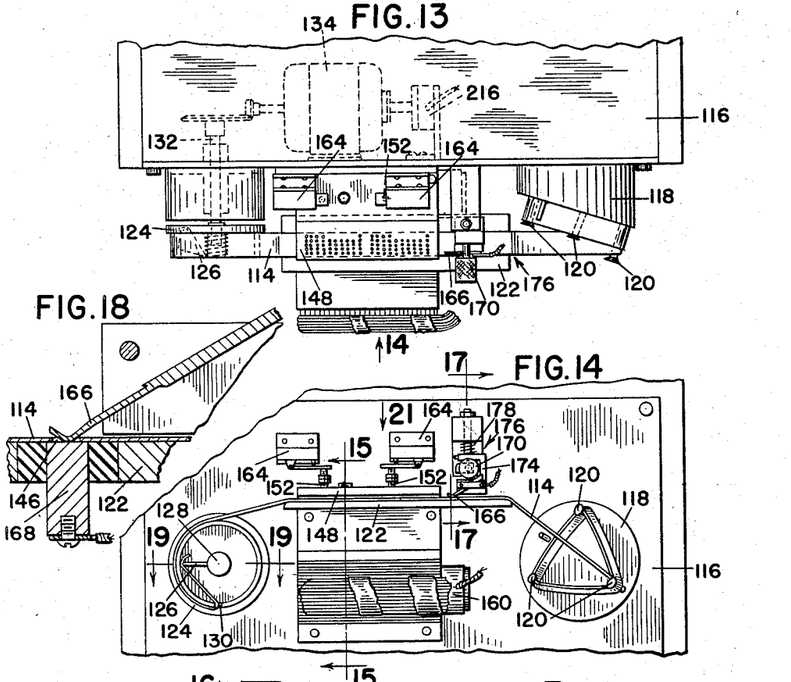
Fig. 13 is a plan view of a part of the control mechanism, looking in the direction of arrow 13 in Fig. 1.
Fig. 14 is a view in elevation, looking in the direction of arrow 14 in Fig. 13.
Fig. 18 is an enlarged section on line 18—18 of Fig. 17.

In the specific construction shown, Figs. 11 and 12, the commutators 78 are shown as fixed, and the brush arm 80 rotates as stated, this brush arm being provided with axial bores or the like at 84 accommodating springs 86 which serve to tend to resiliently move the actual brushes 88 and 89 into contact with the armatures 78. The brushes 88 are double as clearly seen in Fig. 11, and in this case where a gap between armatures 78 is bridged, current will still flow from brushes 88 to brush 89, completing a circuit.

The second stage is indicated at 90 and the third stage is indicated at 92 and they are similar in construction but geared down as stated above.

The purpose and operation of these stages of the control unit resides in the fact that each separate armature or commutator bar has its own electrical lead (see specifically Fig. 10 at 94), and by energizing the selected leads 94, selected armatures 78 may be energized. Thus, in any stage, none, one, or more of the armatures may be thus energized according to a predetermined plan, and when the respective lead screw motor is energized, it will rotate the lead screw 32 according to the energization of the clutches 46, 50 or 60, and these clutches are energized or de-energized according to the energization or de-energization of the respective stages. In other words, wherever a brush arm has stopped from its previous operation, it will rotate under influence of the lead screw and gearing 84 as described, but when it rotates sufficiently to coincide with a change in armatures 78, either from a de-energized armature to an energized one, or vice-versa, the electronic system to be described later operates to detect this and to de-energize the respective clutch 60 which has been operating. The system is such that stage 1 controls first and when it kicks out its respective clutch 60, the next clutch 60 is kicked in, and so on down the line, each stage stopping in turn when its brush arm crosses a dividing line between an energized or a de-energized armature.

In addition, the electronic system also detects whether or not any individual armature is initially positioned across a de-energized or an energized armature, and this in turn determines the energization or deenergization of clutches 46 and 50, so that the direction of rotation of the respective lead screw is determined.

Thus, regardless of where the last operation stopped, the control system automatically moves the work-table in either direction according to the predetermined plan and to the exact spot it is supposed to travel within a thousandth of an inch.

The first three stages, as stated above, are dual directional and are rotated in either direction according to the selected clutch 46 or 50; but the last two stages 4 and 5 are uni-directional only and by control of the clutches 46 and 50, the final position of the table is always in the same direction.

Figure 26:
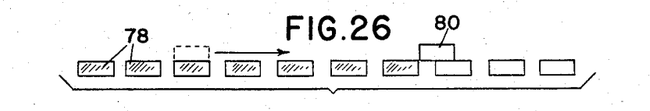
Figs. 26 and 27 are diagrammatic representations of two different stages of automatic adjustment.
Figure 27:
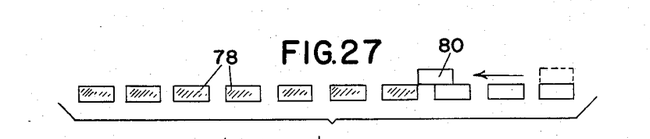
Figure 28:
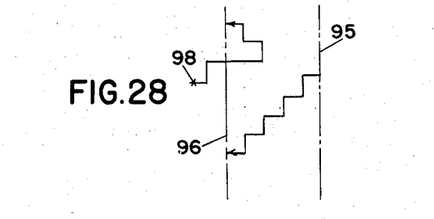
Fig. 28 is a diagram illustrating the operation of the anti-backlash mechanism.

This is illustrated diagrammatically in Figs. 26, 27 and 28. Regarding first Fig. 28, at the right-hand end base line thereof indicated at 95 as a starting point, it will be seen that if the table is to be traveled to the left, all five stages proceed normally in the same direction and finally locate the table as on the line 96.

However, if the initial position of the table is at the point indicated as at 98 at the left-hand side of this diagram, the first three stages causes the table to move slightly past the final position 96, and the final two stages reverse the lead screw and cause the table to come to rest again at the selected point 96, but from the same direction as in the case where the starting position was to the right of line 96. These diagrams give equal lengths to each step for clarity of illustration, but actually of course the following steps decrease to one-tenth of each previous step.

This construction results in the elimination of backlash, since the table is always traveled to final position by the same side of the screw-thread and looseness of the screw in its respective nut is immaterial to accuracy of the device.

This can be explained further by reference to Figs. 26 and 27 wherein the contacts or armatures 78 are projected to a straight line and the pre-selection means has caused the shaded contacts to be energized, the white contacts being unenergized. If the contact "six" is energized, and contact "seven" is not, the brush arm in moving from left to right, will not stop at "six" but will go on to "seven," or at least off from "six," because the brush arm must move until the break is detected. Thus a reversal of motion is necessary to bring the table to the correct position, this being at "six."

If, on the other hand, the motion starts from the right-hand side of the final point, the brush will stop when it contacts "six," because the gap between energization and de-energization is of course at the same point as before, and the change in energization is now detected. In this case, of course, the final two stages act to move the brushes further to the left in order to arrive at the correct final "six" designation. This action is inherent in the device because of the system of energization and de-energization of the respective contacts or armatures, although as far as the first three stages are concerned, if the last two stages are to operate in the opposite direction, and over-running of the final position is the result, then the final two stages bring them back to the selected position, as in Fig. 28.

Figure 8:
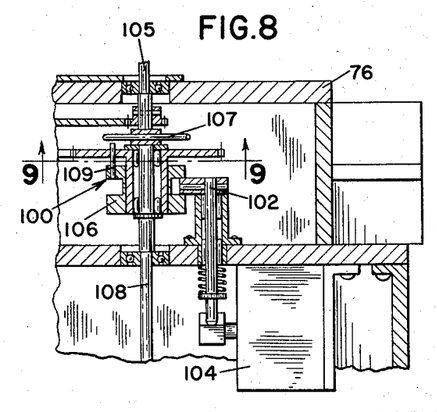
Fig. 8 is an enlarged section on line 8—8 of Fig. 7.
Figure 9:
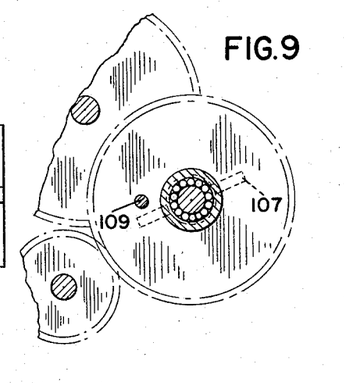
Fig. 9 is a section on line 9—9 of Fig. 8.
Figure 10:
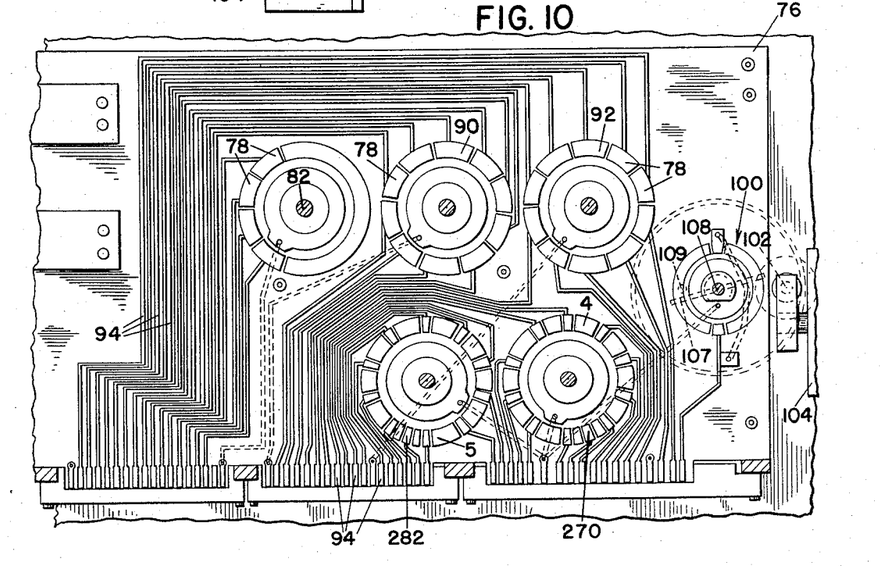
Fig. 10 is a view in elevation with parts in section, looking along the arrows 10—10 of Fig. 6.

In order to provide for uni-directional motion of the final two stages, there is provided a special clutch which is generally indicated at 100, see particularly Fig. 8. This clutch is normally held inoperative by a spring-pressed member 102 under influence of a solenoid 104 and engaged in the groove of a collar 106. This collar is slidable on the shaft 108, and when the solenoid 104 is energized, it pushes the member 102 upwardly in Fig. 8, so that a pin 109 engages a radial pin 107 disposed along the shaft 105 driven by the lead screw 32. The solenoid 104 is operated only after the third stage has completed its action, and again this is accomplished by the electronic circuit to be described below.

Stages 4 and 5 are driven uni-directionally by this clutch due to simultaneous energization of the reversing clutches 50, there being electronic means to ensure that whenever solenoid 104 operates to drive stages 4 and 5, clutch 50 only shall operate, regardless of whether this clutch has been energized or not for driving the three previous stages 1, 2 and 3.

Figure 23:
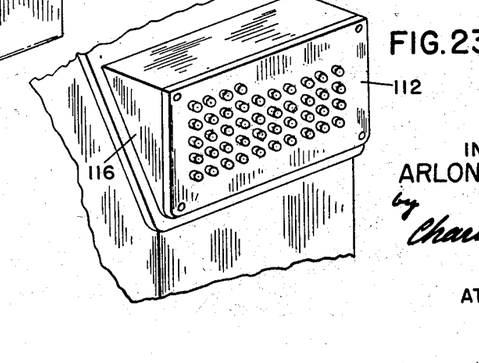
Fig. 23 is a perspective view of a modification of the control box.

In order to pre-select and energize or de-energize the armatures required for a particular operation, the operator may merely push the correct buttons as shown in Fig. 23 to energize the desired leads 94, and these buttons may be set up zero to nine in five stages, although the first stage only requires zero to three for a thirty-inch travel of the table. Of course, the ordinates and abscissa will be effected by a duplication of the control and the control panel which is indicated at 112.

Figure 24:
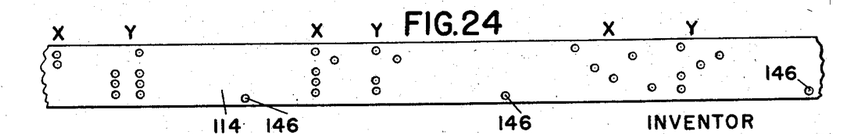
Fig. 24 illustrates the tape showing three different holes to be drilled.

However, this invention also contemplates that the same effect may be achieved automatically by use of a punched tape, a section of which is indicated in Fig. 24. This tape is indicated at 114 and the holes are clearly shown, these being in different locations for each respective tool operation, as for instance, the hole to be drilled by the tool 20. Also the X and Y coordinates are indicated in this figure and as many holes as necessary are punched in order to provide for the automatic energization of the respective leads 94.

Figure 25:
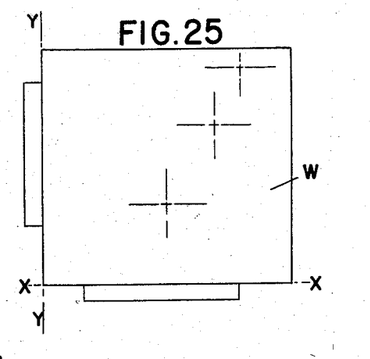
Fig. 25 is a diagram showing the locations of the holes in the workpiece as called for by the tape of Fig. 24.

In order to automatically read the punched tape, which incidentally shows three holes to be controlled according to the diagram of Fig. 25, there is provided a tape reader which is generally shown in Figs. 13 to 21 inclusive. This includes a unit, the driving parts of which may be housed in the control box shown at 116 in Fig. 1. The tape is mounted on an angularly inclined block 118 (see Fig. 13) having three studs thereon at 120. The tape itself is fed from the interior aspect of a coil which has been previously coiled for this purpose as will be described. The tape is withdrawn from the inside of the coil and fed across a reading head or plate 122 and onto a wind-up reel 124.

Figures 16, 19, 20, 21, 22:
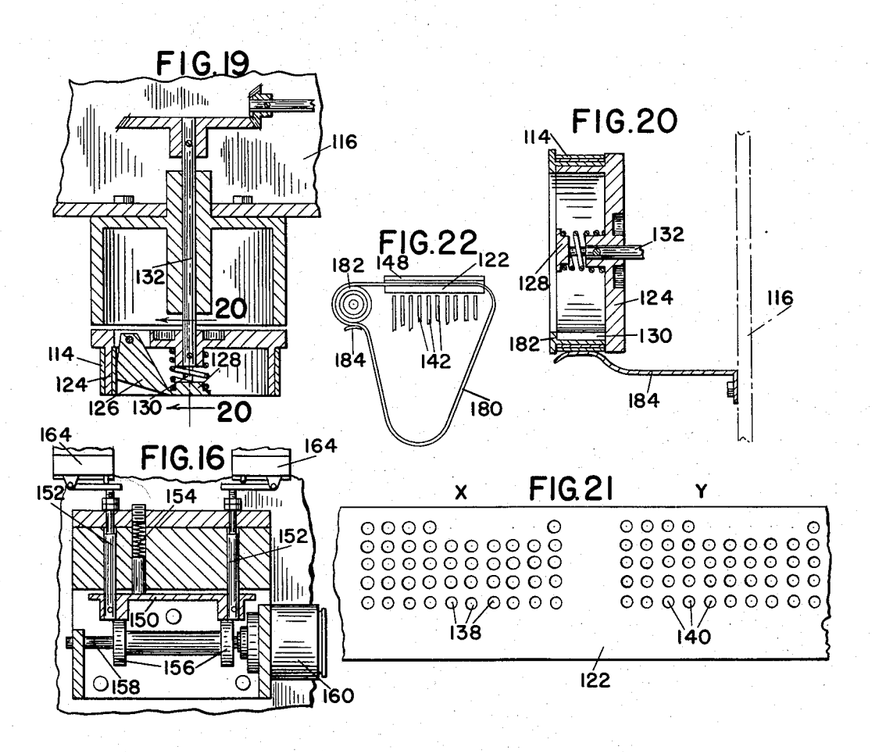
Fig. 16 is a section on line 16—16 of Fig. 15.
Fig. 19 is an enlarged section on line 19—19 of Fig. 14.
Fig. 20 is a section on line 20—20 of Fig. 19 but showing the modified adapter.
Fig. 21 is a plan view showing the plate for the tape and looking in the direction of arrow 21 in Fig. 14.
Fig. 22 is a diagrammatic view illustrating the continuous tape used in a short cycle.
Figure 17:
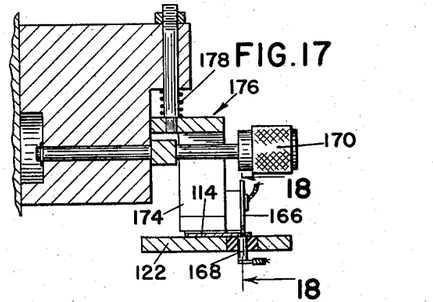
Fig. 17 is an enlarged section on line 17—17 in Fig. 14.

This wind-up reel is shown in detail in Fig. 19 and includes a gripping device 126 which is easily operated by a thumb-piece 128 to release the coil for removal therefrom. As perhaps best seen in Fig. 14, the tape is led in through its slot 130 and is gripped by the piece 126. The take-up reel is then rotated by shaft 132 driven by a motor 134 and the tape is thus automatically fed along the reading table or plate 122.

The operation of motor 134 is controlled in such a way as to continue to feed the tape for a section (see Fig. 24) sufficient to provide for positioning for one hole being drilled and the operator may push a button to start the next operation; or the tape may be long enough and the device may be arranged for automatic action to continue to operate until all the holes are drilled. In the first case, all the operator needs to do is to put in a new tape for each hole in the piece of work. In the second case, the operator merely places the tape in the reader as described, and pushes the button to start the operation, whereupon all the holes will be drilled in sequence without further attention. Thus the tape may be made long enough to repeat the entire cycle, or it may be taken off its wind-up reel and transferred to the studs 120 for a further cycle of operation.

Figure 15:
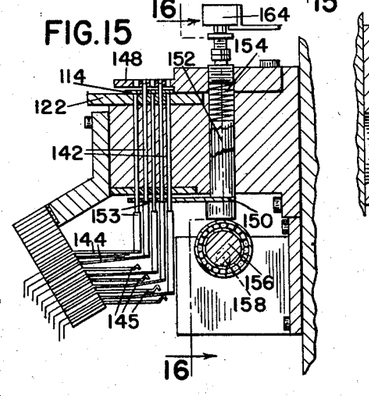
Fig. 15 is an enlarged section on line 15—15 of Fig. 14.

The reading table or plate 122 is provided with holes 138 and 140 as shown in Fig. 21. These holes comprise two complete banks for the X and Y coordinates as indicated, and each hole receives a slidable pin 142 (Fig. 15). Each such slidable pin is provided with contacts indicated at 144, these contacts each having a corresponding connection to a single lead 94.

With the tape in correct position as determined for instance by a hole 146 which is called the "stop hole" and causes cessation of feeding, described hereinafter, the pins are raised, and if they find an opening as by a hole in the tape, then they pass through the same into the top plate as indicated at 148. In this position, the contacts 144 are opened, but unless the pins find an opening to pass through on the tape, the electrical connections are still closed since the pins cannot rise. By reason of this opening of the circuit, respective armatures under control of leads 94 may be de-energized. The result of course would be the same if the connections 144 were reversed and the contacts were closed upon raising the pins.

The pins are raised due to the resilient portions of the contacts 144 (see Fig. 15), which continuously tend to raise these pins. The pins, however, are normally held down by an apertured plate 150 mounted on a pair of posts 152 and engaging enlargements 153 on pins 142. A spring 154 may be used to hold the plate 150 down against a pair of eccentrics 156 on a shaft 158 rotated in a step-by-step manner by a rotary solenoid 160 (Fig. 16).

When the posts 152 are raised, thus elevating plate 150 and allowing the pins to rise under influence of resilient contact strips 145 (see engagement of plate 150 with the shoulders formed by enlarged portions 153 of the pins), the tops of the posts 152 operate a pair of switches 164 which are utilized as safety devices to ensure against any accidental forward feeding of the tape 114, as such accidental motion of the tape would result in tearing the same on the pins. The tops of the raised pins are then received in holes in the top plate 148.

The stop hole 146 is operative by means of a contact arm 166 which acts in a trailing manner on tape 114 and is aligned with the various stop holes. When the feeler 166 encounters a stop hole, it makes contact with a member 168 which is connected to control mechanism for stopping the forward feed of the tape. This stop member may be raised by means of a finger-hold 170 having an eccentric operating in a U-shaped member 174 and mounting the feeler arm 166 by means of which this assembly is raised, so that the tape can be fed in under it and the entire unit, which is indicated at 176, is resiliently compressed downwardly against the tape by means of a spring 178 (see Fig. 17).

If it is desired to run the tape in continuous form so that there will be merely repetitions of the cycle without the necessity of re-threading the tape, the tape may be made as shown at 180 in Fig. 22 in a continuous form, and may be merely continuously fed in a closed path about an adaptor wheel 182 with a spring take-up 184, past the pins 142 which act in the manner described before, and thus it will not be necessary to remove a coiled tape from the take-up 124 as above described if the operations of the machine are to be set for a long run.

Figure 29:
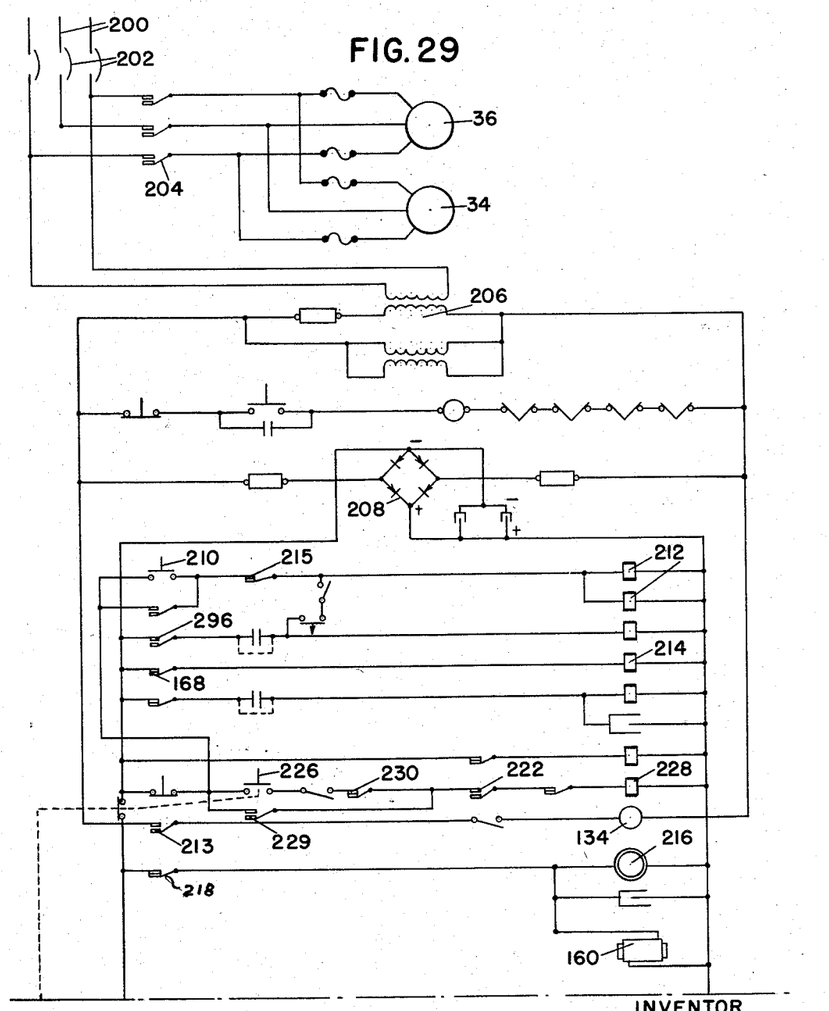
Figs. 29 and 29a illustrate an electric diagram for the driving and control units.
Figure 29A:
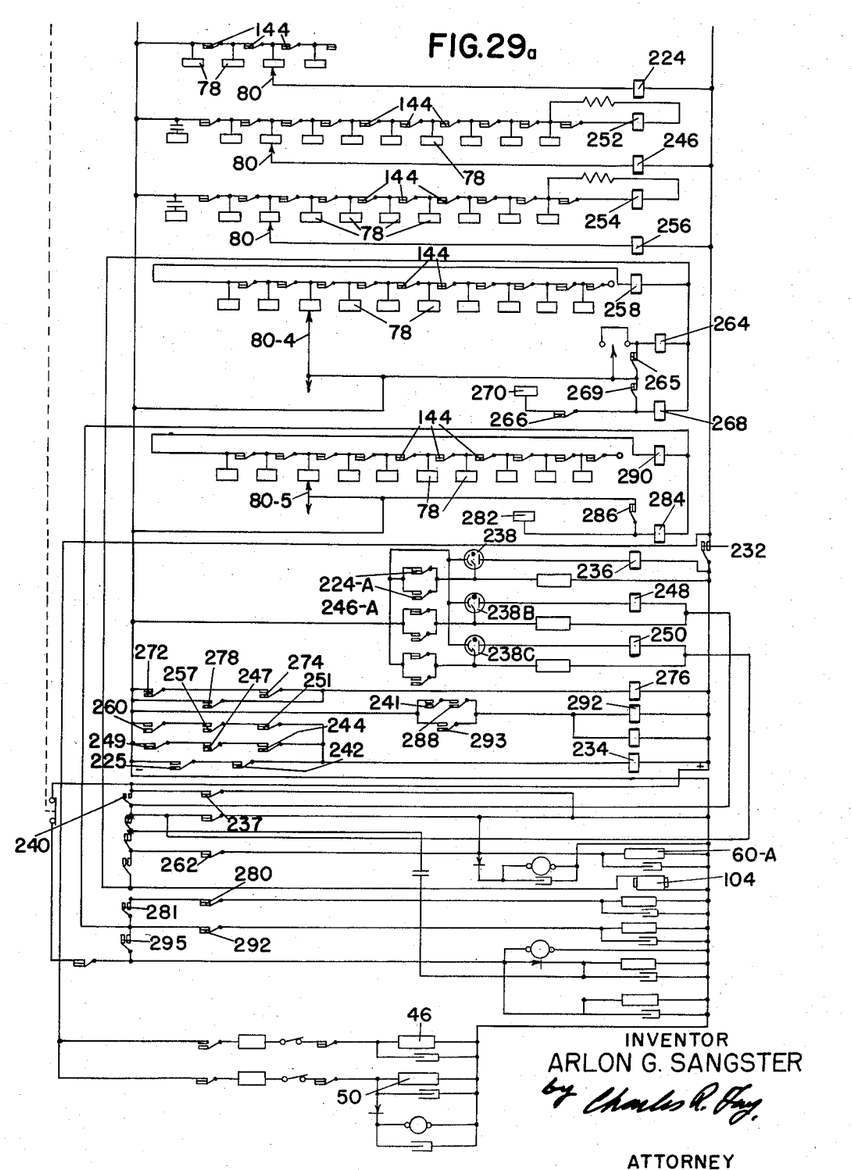

The electrical circuit diagram for the apparatus is illustrated in Figs. 29 and 29A. The numeral 200 illustrates the power line which may be three-phase or three-wire, single-phase having conventional circuit-breakers at 202. The starter mechanism is illustrated generally at 204 but this includes various other elements to be later described. The motors 34 and 36 are illustrated as being connected in to be started by the starting mechanism 202, and the numeral 206 indicates a transformer, while the numeral 208 indicates a D. C. rectifier which although not completely necessary to the operation of the devices, makes greater convenience in the electrification. Certain other circuit-breakers, overload devices, etc. are shown, but are not described, as being conventional.

The reference numeral 210 indicates a push-button which will energize the relays 212 for the tape feeder, and contact 213 is closed thereby whereupon the motor 134 starts to feed the tape. This operation continues until stop contact 168 is reached as above described, and thereupon relay 214 is energized to open normally-closed contact 215 which de-energizes the relays 212. This stops the feed motor 134 at the point of reading of the tape by the pins 142.

Magnetic brake 216 is energized to prevent motor 134 from coasting, by closing contact 218 which is done by the relays 212 as they drop out. At the same time, the solenoid 160 is energized to elevate fingers 142. A contact 222 which is a part of relay 214 is closed when the tape is thus positioned, and at this point contacts as those at 144 are open according to the position of pins 142 in turn according to the arrangement of the holes in the tape.

The machine is now ready to operate. The relay 224 is initially energized or not, depending upon the last position of the arm 80, i. e. whether it is relatively to the right or left of the desired direction. The table position button 226 is then pressed and this energizes relay 228 which is sealed in by a contact 229. Contact 230 is closed by the action of relay 212 to ensure that the tape is stopped in the reading position and cannot accidentally move.

Contact 232 which is a part of relay 228 is closed upon the pressing of the push-button 226 and this completes a circuit, so that a contact 225 may be in operation, contact 225 being either open or closed according to the condition of relay 224. This action then energizes or fails to energize a relay 234 which controls the forward and reverse clutches 46 and 50 to energize one or the other selectively and exclusively. The first stage clutch 60–A is now energized through contact 232, which in turn is energized through contact 237 of relay 236 (de-energized).

Now the device is in operation and arm 80 is moving by means of a screw 32. The arm 80 is seeking a de-energized contact, and when it moves onto such contact, relay 224 is de-energized.

During the interval of change from energization to de-energization of this relay, the circuit at 224–A is momentarily opened and this causes a gaseous discharge tube indicated at 238 to fire, to make the same momentarily conductive, and this energizes relay 236, whereupon normally closed contact 237 opens, so that the first stage clutch 60–A becomes de-energized.

Contact 240 is closed upon the opening of contact 237 to set up the second stage clutch and also contact 242 opens to prevent change on the control of the first stage, i. e. to demobilize the same, since it has now completed its action. Contact 244 closes, and contact 247 controls and acts like contact 225 to carry out a similar function.

Relay 246 takes over the control in the same manner as relay 224 did previously but now the circuit is in the second stage and the second trigger tube 238–B is fired as was explained above as to the first trigger tube (gaseous discharge tube), and it is emphasized that it is the momentary energization in the circuits 224–A, 246–A, etc. that causes the trigger tube to fire, with the result above described, and in this connection reference is made to elements 247 and 249.

The third stage controlled by the trigger tube 238–C is operated in exactly the same way as the second stage and there are also provided similar means in the third stage as safety guards, etc. as above described previously to the other stage.

It must be understood that the fourth and fifth stages are uni-directional only and are provided with special clutch means as previously described to provide for this. These stages have extra relays as will be described below, and the third stage relay 250 is locked out by the firing of tube 238–C and contact 251 which is a part of and is operated by relay 250. The relay 256 has a contact 257, and acts in the same manner as the relay 246; and relay 248 has a contact 260 all as above described with respect to the second stage.

Relay 250 being energized by contact 262 energizes the fourth stage clutch and solenoid 104, which engages clutch 107 (Fig. 8). This action closes relay 264 which is sealed in by contact 265 and closes contact 266 on relay 264, and this runs until flying contact 80—4 hits the special inter-contact 270. However, relay 268 is energized and contact 269 seals it in. The flying contact 80—4 now runs, contact 272 on relay 258 is closed, and flying contact 80—4 continues to run until it strikes the right contact 78 to energize the relay 258.

Relay 258 closes contact 272 and relay 276 is energized and opens its contact 280 which de-energizes the fourth stage clutch, and this contact 281 closes and energizes the fifth stage clutch.

Flying contact 80—5 now starts and rotates until it strikes special inter-contact 282, and this energizes relay 284 which is sealed in by contact 286.

Relay 284 has a contact 288 which is operated at the same time to be closed and the fifth stage continues to run until the flying contact 80—5 reaches the pre-selected contact and this energizes relay 290 and contact 291 which is thus closed and energizes relays 292, sealed in by contact 293. Relay 292 has another contact 294 which is opened thereby and drops out the fifth stage clutch. Contact 295 is on relay 292 and upon being closed thereby, energizes the magnetic brakes 64 and 74. The relays 268 and 276 are provided respectively with contacts 274 and 278, the operation of which will be clear from the above.

This action moves the tape to the next location without moving the table in order to save time between machine operations and relay 292 has a contact 296 which is operated therewith to start the tape motor 134.

What is claimed is:
1. Apparatus for accurate positioning of a movable element comprising power means, means to move the element thereby, a control device, connections from the control device to the power means to control the latter, said control device comprising a series of movable control members, means driving said members from the power means, certain of said members being capable of motion in either of two directions and certain other members being capable of motion only uni-directionally, the uni-directionally movable members being located at the end of the series and controlling the final point of position of the movable element.

2. Apparatus for positioning a movable element comprising means for moving the element directly, positionable control means for controlling the element moving means, and means for pre-selecting the control positions, said control means comprising a plurality of movable control members movable according to the pre-selection means, said first-named means moving the movable members, and means controlling the operation of the first-named means in steps from said movable members.

3. Apparatus of the class described comprising a movable element to be positioned, drive means, a driving connection between the drive means and the movable element for moving the latter in either of two directions, a control device including driven control members for controlling the direction and degree of speed of the movable element in steps, said driving means driving said control members, means controlled by the degree of motion of said driven control members controlling the operation of the driving means, and pre-selected means determining the degree of movement of said driven control members.

4. Apparatus of the class described comprising a movable element to be positioned, a drive means, a shaft between the drive means and the movable element for moving the latter in either of two directions, a transmission device between the drive means and shaft, a control device including driven control members with one member being the last-operating for controlling the transmission device and hence the direction and the amount of motion of the movable element in steps of decreasing sizes, means controlled by the motion of said control members controlling the operation of the drive means, and pre-selected means determining the degree of movement of said driven control members, and means restraining the last-operating control member to uni-directional motion regardless of the original position of the movable element.

5. Apparatus of the class described comprising an element to be positioned, drive means, an adjustable connection between the drive means and the element for moving the latter in either of two directions, a control device including driven control members for controlling the direction and speed of the connection in steps, said drive means driving said control members, means controlled by the motion of said control members controlling the operation of the connection, and pre-selected means determining the degree of movement of said driven control members, said last-named means including operator operated devices for pre-selcting certain of many control points, said points including electric contacts, and connections therefrom to the control members of the control device.

6. Servo positioning mechanism comprising an element to be moved in either of two directions, drive means connected to the element to move the same, transmission means between the drive means and the element, a series of control members movable from position-to-position to determine the action of the transmission means, said control members being movable seriatim, means to move the control members, means predetermining the amount of movement of each control member, means connecting the control member and the transmission means to control the latter according to the movement of the respective control members, one after the other.

7. The mechanism of claim 6 wherein the initial control member moves in either of two directions and the last operating control member is uni-directional only.

8. Positioning apparatus comprising a series of control members each including a plurality of contacts and a relatively movable contact arm, means pre-selecting certain of the contacts to energize the same, means to relatively move the control member contacts and contact arms one after the other varying amounts depending on the particular contacts energized, an element to be positioned, said control member moving means also moving the element, power means to operate the control member moving means, said power means being controlled through the control members and being operated in accordance with the respective particular energized contacts thereof.

9. Positioning apparatus comprising a series of control members each including a plurality of contacts and a relatively movable contact arm, means for selecting certain of the contacts to energize the same, means to relatively move each arm and its contacts in sequence varying amounts depending on the particular contacts energized, an element to be positioned, said contact moving means also moving the element, electric power means to operate the control member moving means, and means controlling the power means in accordance with the respective particular energized contacts of the control members, as the latter move individually and relative to the respective contact arms.

10. The apparatus of claim 9 wherein the contact selecting means includes a tape punched according to the contacts desired to energize.

11. The apparatus of claim 9 wherein the contact selecting means includes a tape punched according to the contacts desired to energize, and means to feel the punched holes and provide for the selected contact energization thereby.

12. The apparatus of claim 9 wherein the contact selecting means includes a set of manually operable switch actuating devices.

13. Positioning apparatus comprising a series of movable control members, a series of contacts on each control member, a contact arm for each series of contacts, means selectively to energize certain of the contacts in each control member, means to move the control members seriatim relatively to the contact arms, a plurality of energizable means individually controlling the control member moving means to move it variable amounts, each control member controlling the operation of a respective one of said plurality of means according to the energization of the contacts, each said series of contacts causing a defined degree of interval of energization for each of said plurality of means, and an element associated with the control member moving means and moved thereby according to the control members.

14. Positioning apparatus comprising a series of movable control members, a series of contacts on each control member, a contact arm for each series of contacts, means selectively to energize certain of the contacts in each control member, means to move the control members seriatim relatively to the contact arms, a plurality of energizable means individually controlling the control member moving means to move it variable amounts, each control member controlling the operation of a respective one of said plurality of means according to the energization of the contacts, each said series of contacts causing a defined degree of interval of energization for each of said plurality of means, and an element associated with the control member moving means and moved thereby according to the control members, said control member moving means being an electric motor, said plurality of means including a gear reduction, each one of said plurality of means being driven at a different rate of speed by the motor.

15. Apparatus for positioning a movable element comprising a shaft effective to move the element, positionable control means for controlling the shaft rotation, and settable means for pre-selecting the control positions thereof, said control means comprising a plurality of multicontact control members, one or more of the contacts thereof being energizable according to the setting of the pre-selection means, said shaft moving the control members, and means controlling the operation of the shaft by the respective energization of the contacts, means acting to transfer the control action from each control member to the next ensuing control member upon arrival at a point of change of energization of the contacts, and means to decrease the speed of rotation of said shaft at each such transfer.

16. The apparatus of claim 15 including means restricting the terminal control member to a uni-directional movement.

17. Apparatus of the class described comprising a movable element, driving means therefor for moving the same in either of two directions, a control device including driven control members for controlling the direction and amount of movement of the element in steps, means driving said control members, means controlled by the motion of said control members controlling the operation of the driving means, and pre-selected means determining the degree of movement of said driven control members, said last-named means including operator operated devices for pre-selecting certain of many control points, said points including electric contacts, connections therefrom to the control members of the control device, each control member including a plurality of contacts and a relatively movable brush member to sweep the contacts, and means restricting the motion of the brush members to a substantially sequential action thereof.

18. Apparatus of the class described comprising a movable element, driving means therefor for moving the same in either of two directions, a control device including driven control members for controlling the direction and amount of movement of the element in steps, said driving means driving said control members, means controlled by the motion of said control members controlling the operation of the driving means, and preselected means determining the degree of movement of said driven control members, said last-named means including operator operated devices for pre-selecting certain of many control points, said points including electric contacts, and connections therefrom to the control members of the control device, each control member including a plurality of contacts and a relatively movable brush member to sweep the contacts, clutches for the control elements for connecting the table and shaft, a gear reduction means for each clutch, each control member controlling a clutch and means to restrict the motion of the brush members to a sequential operation.

19. The apparatus of claim 18 including a pre-punched tape controlling the energization of the contacts.

20. The apparatus of claim 18 including a mechanically operable set of switches controlling the energization of the contacts.

21. Servo positioning mechanism comprising an element to be moved in either of two directions, drive means, an adjustable driving connection from the drive means to the element to move the latter, a series of control members movable from position-to-position, to determine the action of the driving connection, said control members being movable seriatim only, means to move the control members from the driving connection, means predetermining the amount of movement of each control member, means connecting the control members and the driving connection to operate the latter according to the movement of the respective control member one after the other, each control element comprising a relatively movable brush and a series of contacts, said predetermining means acting to energize certain only of the contacts.

22. Servo positioning mechanism comprising an element to be moved in either of two directions, drive means, variable transmission means connecting the drive means to the element to move the same at different speeds, a series of control members movable from position-to-position to determine the action of the transmission, means driving said control members from the drive means, seriatim, means predetermining the amount of movement of each control member, means connecting the control members and the transmission to energize the latter according to the movement of the respective control members, one after the other, said control members each comprising a series of contacts individually energized or de-energized according to the predetermining means, a feeler arm to determine the energized or de-energized condition of the contacts, and means controlled by the feeler arm to operate the transmission accordingly both as to direction and degree.

23. Apparatus of the class described comprising an element to be positioned, drive means, a variable connection between the drive means and the element for moving the latter in either of two directions, a control device including driven control members, means controlled by the motion of said control members controlling the direction of operation of the variable connection, and pre-selected means determining the movement of said driven control members, said last-named means including operator operated devices for pre-selecting certain of many control points, said points including electric contacts, and connections therefrom to the control members of the control device.

24. Apparatus of the class described comprising an element to be positioned, drive means, a variable connection between the drive means and the element for moving the latter in either of two directions, a control device including driven control members for controlling the direction of operation of the connection, and pre-selected means determining the degree of movement of said driven control members, said last-named means including operator operated devices for pre-selecting certain of many control points, said points including electric contacts, and connections therefrom to the control members of the control device, said operator operated devices including a tape, means to feel the tape en bloc, and electric switches controlled by the feeling means.

25. Positioning apparatus comprising a series of movable control members, a series of contacts on each control member, a contact arm for sweeping each series of contacts, means selectively to energize certain of the contacts in each control member, means to move the control members seriatim relatively to the contact arms, a plurality of energizable means individually controlling the control member moving means to move it variable amounts, each control member controlling the operation of a respective one of said plurality of means according to the energization of the contacts, each said series of contacts causing a defined degree of interval of energization for each of said plurality of means, and an element associated with the control member moving means and positioned thereby according to the setting of the control members, said control member moving means including drive means, and said plurality of means including a gear reduction, each one of said plurality of means being driven at a different rate of speed.

26. Servo positioning mechanism comprising an element to be moved in either of two directions, a motor, a lead screw connected to the element to move the same, a variable transmission belt, motor and lead screw, a series of control members movable from position-to-position to determine the direction and speed of rotation of the lead screw, means driving said control members seriatim, means predetermining the amount of movement of each control member, means connecting the control members and the transmission to energize the latter according to the movement of the respective control members, one after the other, said control members each comprising a series of fixed contacts individually energized or de-energized according to the predetermining means, a rotary feeler arm driven by the lead screw to determine the energized or de-energized condition of the contacts, and means controlled by the feeler arm to operate the transmission accordingly both as to direction and degree.

27. Apparatus of the class described comprising a movable element to be positioned, a motor, a connection between the motor and the movable element for moving the latter in either of two directions, a control device including a series of driven control members for controlling the direction of rotation of the motor and the amount of rotation thereof in steps, said motor driving said control members, means controlled by the degree of motion of said driven control members controlling the operation of the connection, and pre-selected means determining the degree of movement of said driven control members under influence of the motor, each control member having a series of contacts and said pre-selection means comprising a pre-perforated element, a reading device therefor including a series of rows of pins for entry into the perforations, and means actuated by the individual pins to change the energized status of each contact.

28. The apparatus of claim 27 including means normally urging the pins to enter the perforations, the pre-perforated element itself preventing such entry except at the perforations, means to retract the pins from the perforations, and means to feed the pre-perforated element to a new setting.

29. The apparatus of claim 27 including means normally urging the pins to enter the perforations, the pre-perforated element itself preventing such entry except at the perforations, means to retract the pins from the perforations, and means to feed the pre-perforated element to a new setting, wherein the pre-perforated element is in the form of a tape, means to stop and lock the tape at the new setting, and means to render the pin retracting means ineffective to repeat the motion thereof to enter the perforations.

30. The apparatus of claim 27 including means normally urging the pins to enter the perforations, the pre-perforated element itself preventing such entry except at the perforations, means to retract the pins from the perforations, and means to feed the pre-preforated element to a new setting, wherein the pre-perforated element is in the form of a tape, means to stop and lock the tape at the new setting, and means to render the pin retracting means ineffective to repeat the motion thereof to enter the perforations wherein the tape is endless and including a pair of reels operative to pass the tape repeatedly through the reading device.

31. The apparatus of claim 27 including means normally urging the pins to enter the perforations, the pre-perforated element itself preventing such entry except at the perforations, means to retract the pins from the perforations, and means to feed the pre-perforated element to a new setting, wherein the pre-perforated element is in the form of a tape, means to stop and lock the tape at the new setting, and means to render the pin-retracting means ineffective to repeat the motion thereof to enter the perforations including a feed and take-up reel for the tape, the latter being wound on the reel for re-use, and a tape holder from which the tape is fed to the reading device from the interior of the tape roll avoiding rewinding of the tape prior to re-use.

32. The apparatus of claim 27 including means normally urging the pins to enter the perforations, the pre-perforated element itself preventing such entry except at the perforations, means to retract the pins from the perforations, and means to feed the pre-perforated element to a new setting, wherein the pre-perforated element is in the form of a tape, means to stop and lock the tape at the new setting, and means to render the pin retracting means ineffective to repeat the motion thereof to enter the perforations including a feed and take-up reel for the tape, the latter being wound on the reel for re-use, and a tape holder from which the tape is fed to the reading device from the interior of the tape roll avoiding rewinding of the tape prior to re-use wherein the tape holder comprises a series of studs to support the tape roll, said studs being mounted on an element having its stud-bearing surface at an angle to line of travel of the tape through the reading device.

33. A reading device for a perforated element comprising a plate perforated in a series of rows, a slidable pin for each perforation in the plate, yielding means urging the pin to project through the plate, means to hold the pins with the ends thereof at or below one surface of the plate, means to position the perforated element on the plate with the perforations in the element aligned with the perforations in the plate, means to render the pin holding means ineffective so that each pin aligned with a perforation in the element is projected thereinto by said yielding means, electrical means for each pin having the state of energization thereof changed by the position of its pin, and means to interpret the state of energization of the electrical means.

34. The device of claim 33 wherein the pin holding means and the means to render the same ineffective are intermittently operated and including means to feed the perforated element for successive changes of energization status of said electrical means.

35. The device of claim 33 wherein the pin-holding means and the means to render the same ineffective are intermittently operated and including means to feed the perforated element for successive changes of energization status of said electrical means, a mechanism controlled by the electrical means and having a cycle of operation, and means to retain the state of energization of the electrical means until the finish of each cycle.

36. The device of claim 33 wherein the yielding means comprises a pair of electric switch contact spring arms normally in contact and one of which urges its respective pin away from the other to break the contact.

37. Apparatus for reading a tape perforated in rows comprising a series of rows of pins, means to align the tape and the pins, means to move the pins axially simultaneously, certain pins being stopped by the tape when imperforated and other pins extending through the tape at the perforations, and means energized only by the pins extending through the tape to indicate the presence and arrangement of the perforations.

38. Apparatus for reading a perforated tape comprising a series of rows of pins, means to align the tape and the pins, means to move the pins directly axially simultaneously, certain pins being stopped by the tape when imperforated and other pins extending through the tape at the perforations, and means energized only by the pins extending through the tape to indicate the presence and arrangement of the perforations, means to feed the tape in steps, and means to stop the tape intermittently with the perforated area in the area of the pins.

39. Apparatus for reading a perforated tape comprising a series of rows of pins, means to align the tape and the pins, means to move the pins axially simultaneously, certain pins being stopped by the tape when imperforated and other pins extending through the tape at the perforations, and means energized only by the pins extending through the tape to indicate the presence and arrangement of the perforations, said means including an electric switch for each pin, said switches being operated by the pin motion, and a series of control contacts, one contact for each pin, a movable control member, and means to pass the latter over the contacts to detect the energized condition thereof.

40. Apparatus for positioning a movable element comprising means for moving the element directly, initially and sequentially operable control means positionable for controlling the element moving means, and means for pre-selecting the control positions, said control means comprising a plurality of movable control members movable according to the pre-selection means, said first-named means moving the movable members, means controlling the operation of the first-named means in steps, and means disengaging the sequentially operating control means during operation of the initially operating control means.

41. The apparatus of claim 40 including means to provide relatively high speeds in the initially operating control means while the sequential, slower operating control means are disengaged.

42. Apparatus of the class described comprising a movable element to be positioned, drive means, a driving connection between the drive means and the movable element for moving the latter in either of two directions, a control device including driven control members for controlling the direction and degree of speed of the movable element in steps, said driving means driving said control members, means controlled by the degree of motion of said driven control members controlling the operation of the driving means, and pre-selected means determining the degree of movement of said driven control members, said driving connection including a series of clutches and speed reducing gearing of different reduction for each clutch.

43. Apparatus for accurate positioning of a movable element comprising power means, means to move the element thereby, a control device, connections from the control device to the power means to control the latter, said control device comprising a series of movable control members, means driving said members from the power means, certain of said members being capable of motion in either of two directions, and means pre-selecting the direction of motion thereof.

44. Apparatus for accurate positioning of a movable element comprising power means, means to move the element thereby, a control device, connections from the control device to the power means to control the latter, said control device comprising a series of movable control members, means driving said members from the power means, certain of said members being capable of motion in either of two directions, and means pre-selecting the direction of motion thereof, said last-named means including a series of contacts in said control device, means to energize certain of the contacts, a flying contact to feel the first-named contacts, and means to cause motion of said members in a direction according to the energized or unenergized state of the contact upon which the flying contact rested at the previous action of the device.

45. The apparatus of claim 42 wherein the multiple clutches comprise means reducing the speeds of the individual control members of previous steps when a slower driving clutch is used subsequently to a faster driving clutch.

References Cited in the file of this patent

UNITED STATES PATENTS

| | | |
|---|---|---|
| 1,624,156 | Brewster | Apr. 12, 1927 |
| 2,057,111 | Potts | Oct. 13, 1936 |
| 2,630,722 | Benzon | Mar. 10, 1953 |
| 2,672,067 | Hansell | Mar. 16, 1954 |